INVENTOR
R. C. PRYOR
BY
*Young & Quigg*
ATTORNEYS

INVENTOR
R. C. PRYOR
BY
Young & Quigg
ATTORNEYS

Patented Aug. 15, 1967

3,336,019
PROCESS AND APPARATUS FOR HEATING PARTICULATE SOLIDS IN A ROTARY KILN
Robert C. Pryor, Bartlesville, Okla., assignor to Phillips Petroleum Company, a corporation of Delaware
Filed May 17, 1965, Ser. No. 456,371
12 Claims. (Cl. 263—33)

ABSTRACT OF THE DISCLOSURE

A rotary kiln is provided with an axial burner comprising a burner body having an axial nozzle supplied form a first fuel line and a ring of surrounding nozzles supplied from a second fuel line. Separate flow control means are provided in the first and second fuel lines. The flow rate of fuel to the axial nozzle is regulated to control stack gas temperature and the flow rate of fuel to the ring nozzles is regulated to control the temperature of heated solids egressing from the kiln. A primary air annulus is fed longitudinally along the outside of the burner to mix with and burn the fuel from the ring nozzles. An outer annulus of air is fed into the kiln to burn fuel from the axial nozzle deeper in the kiln.

---

Figure 1:
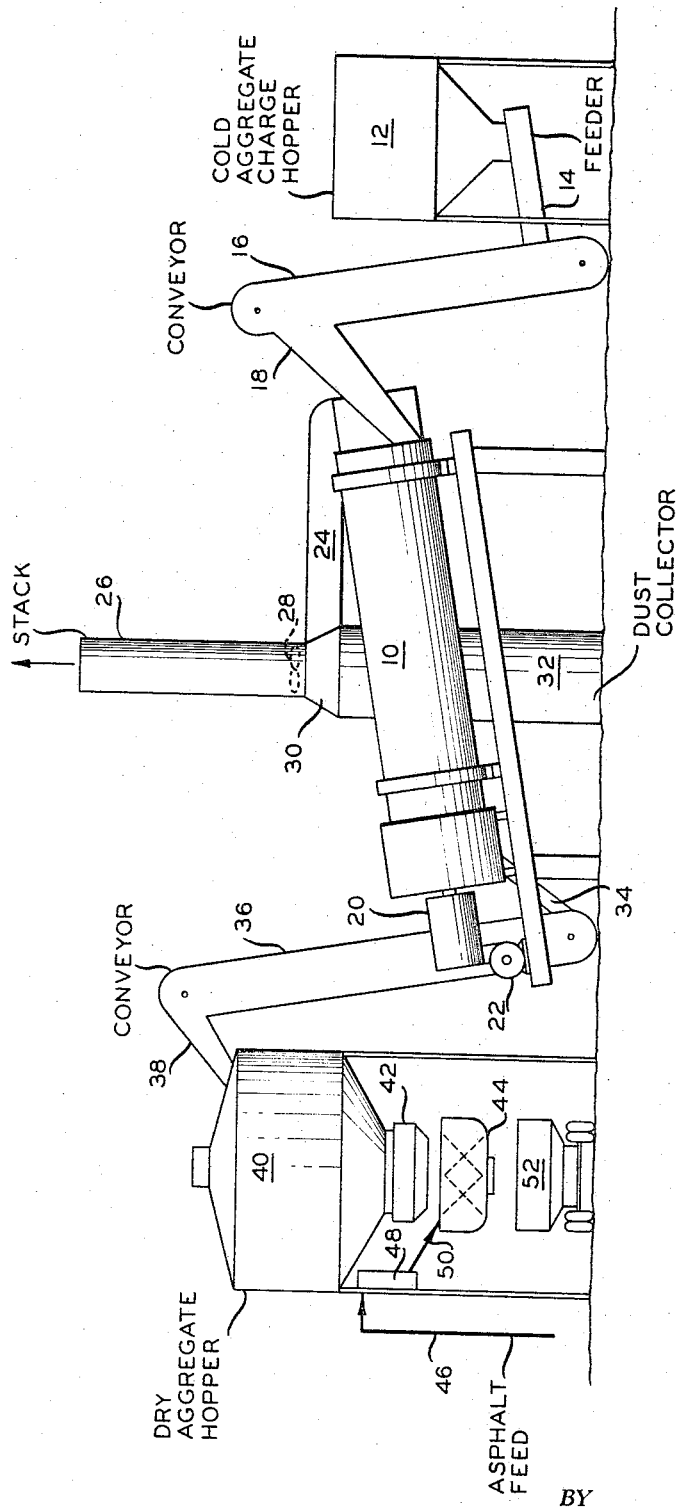

This invention relates to a process and apparatus for heating particulate solids. A specific aspect of the invention is concerned with the heating of rock aggregates for combining with hot asphalt cement to be used in bituminous road construction and similar paving.

In order to prepare rock aggregate for combining with hot asphalt cement, it is necessary to substantially completely dry the aggregate so that the hot cement forms a good bond with the rock. The drying process is effected in a kiln such as a rotary kiln by heating the rock aggregate with hot combustion gas. This dries the rock and heats the same substantially to the desired temperature for mixing with the hot asphalt cement. The heating is conventionally accomplished with fuel oil which is burned in a burner positioned in an elongated refractory throat which leads into the downstream end of the kiln. The throat on which the fuel oil is burned has a length of 10 to 15′ and is expensive since it must be made with a refractory lining which has a life of about six months and costs from $10,000 to $15,000 in the average kiln. With present equipment it is difficult to burn the fuel oil without producing "black stack," a term designating black smoke belching from the flue gas stack of the kiln. In road building, alert inspectors look for "black stack" as a sign to check the aggregate for oily film which is an indication that the aggregate is not properly dried. This condition contributes to compaction problems as well as preventing good adhesion to aggregates. "Black stack" also has the disadvantage of wasting a substantial proportion of the fuel oil fed to the burner.

It is an object of the invention to provide an improved process and arrangement of apparatus for heating and/or drying particulate solids. Another object is to provide an improved process and arrangement of apparatus for heating and drying rock aggregate preparatory to combining the heated and dried rock with the hot asphalt type cement. A further object is to provide a process and arrangement of apparatus for burning liquid normally gaseous hydrocarbon fuel such as propane or LP-gas in the heating and drying of rock aggregate in a rotary kiln preparatory to mixing the dried and heated rock with hot asphalt cement. It is also an object of the invention to provide a process and apparatus for heating hot rock aggregates with more efficient control of the heated aggregate and of the effluent gas temperature. Still another object is to provide an improved arrangement of nozzles for injecting separate streams of liquid normally gaseous fuel at separate controlled flow rates. A further object is to provide a method and apparatus for burning liquid normally gaseous hydrocarbon fuel in a rotary kiln which materially reduces the heat loss in the throat of the kiln. Other objects of the invention will become apparent to one skilled in the art upon consideration of the accompanying disclosure.

A broad aspect of the invention comprises an axial fuel nozzle supplied by a separate fuel line with a motor valve therein and surrounded by a ring of fuel nozzles supplied by a second fuel line having a motor valve therein whereby the amounts of fuel injected thru the axial nozzle and the ring of nozzles are separately controlled. The nozzle system is positioned in the throat of a rotary kiln at such location that the combustion of the fuel from the ring of nozzles forms a flame which impinges only on the innermost end of the throat, such as the 4–8″ section of the throat immediately adjacent the downstream end of the kiln. Combustion air is supplied for the combustion of the injected fuel by injecting an annular mass of air into the kiln around the ring of nozzles in such volume as to provide at last stoichiometric portions of air and fuel.

Figure 2:
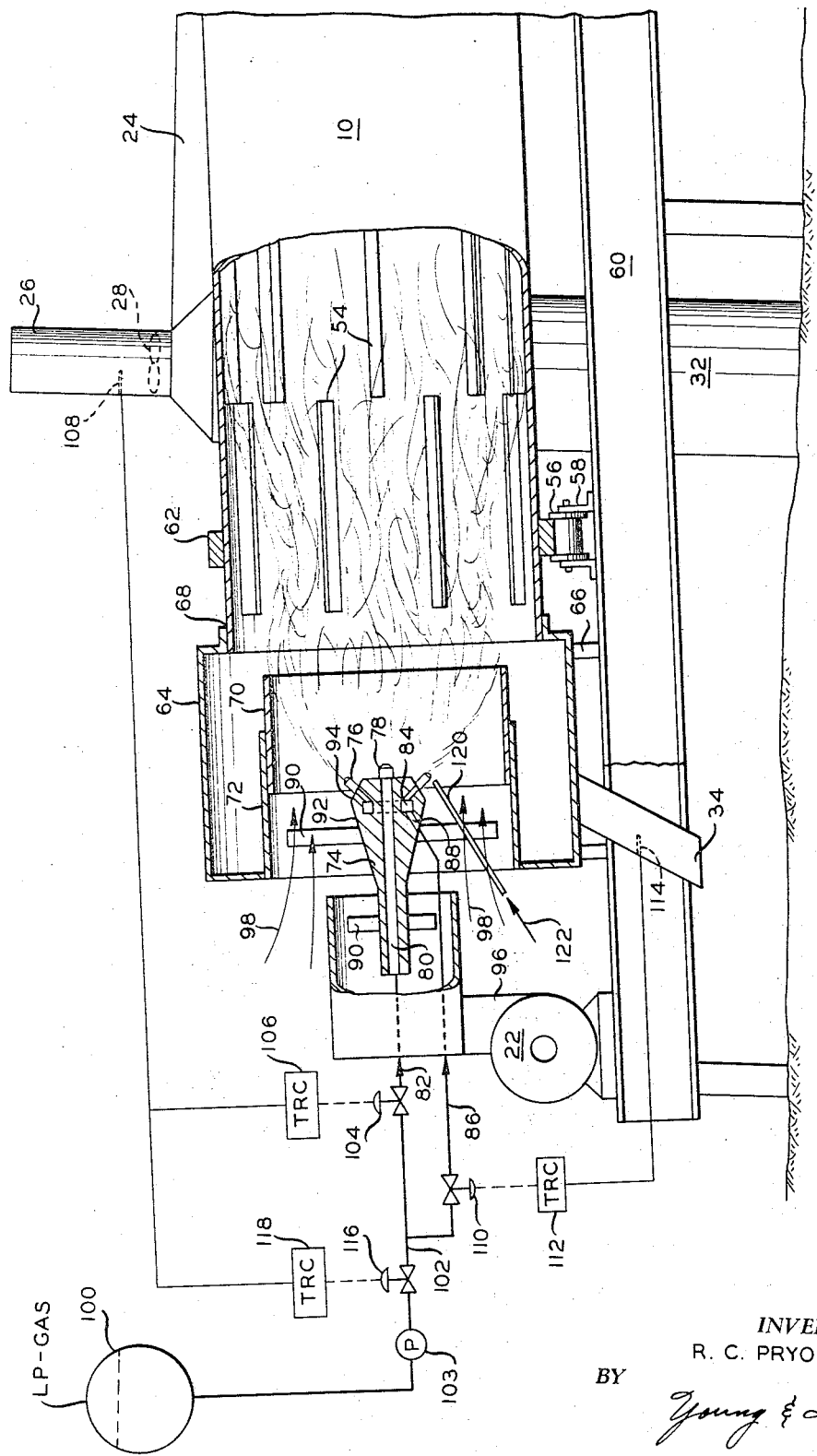

A more complete understanding of the invention may be had by reference to the accompanying schematic drawing of which FIGURE 1 is a plant flow illustrating a typical hot mix asphalt plant; and FIGURE 2 is an elevation in partial section of the downstream end of the rotary kiln of FIGURE 1 and the arrangement of fuel supply and control apparatus for the fuel supply.

Referring to FIGURE 1 a rotary kiln 10 is supplied cold aggregate from hopper 12 by means of feeder or conveyor 14, elevator 16, and chute 18. Hot combustion gas supplied by burner means 20 directs fuel substantially axially into dryer 10. Blower 22 supplies combustion air for burning of the fuel in the dryer. Effluent combustion gas and moisture from the rock aggregate passes thru conduit 24 into stack 26 which is provided with exhaust fan 28 for inducing flow of secondary air into the burner end of the dryer and forcing the exhaust gas from the stack. The flared section 30 of the stack functions as a cyclone separator to separate the larger rock particles from the stack gas and deposit same in the dust collector section 32 for removal and combining with the hot mix downstream of the dryer. Hot dry rock is passed from the kiln thru conduit 34 into elevator or conveyor 36 which delivers the hot dry rock thru chute 38 into hopper 40. The heated rock is delivered thru a feeder 42 into a pug mill 44 into which hot asphalt feed from line 46 is metered therewith thru metering device 48 and line 50. Truck 52 transports the hot asphalt mix received from pug mill 44 to the use site.

FIGURE 2 shows the downstream end of kiln 10 which is provided with lifting flights 54 which elevate the rock passing thru the kiln and provide a gravitating mass of rock in the kiln for intimate contacting with the hot combustion gas and flame therein. The kiln is rotated on rollers at either end such as rollers 56 supported by brackets 58 from steel support frame 60. Rollers 56 operate on a track or band 62 suitably attached to the kiln wall such as by welding.

The downstream end of kiln 10 comprises a stationary hood 64 supported by suitable supports from frame 60 such as legs 66. Suitable sealing means between hood 64 and the cylindrical shell of kiln 10 is provided as shown at 68. A throat in the form of a heavy steel ring 70 is supported coaxially with the shell of kiln 10 by means of a flange 72 integral with the hood 64. It is also feasible to utilize a refractory throat in lieu of the steel throat 70 and extend the same to the extreme left end of the hood 64.

A burner head 74 is positioned axially with respect to the kiln and throat 70 so that the flame provided by the burner impinges on the inner wall of throat 70 substantially as shown in the range of about 4 to 10″ from the extreme inner end of the throat. Burner head 74 is provided with a ring of nozzles 76 surrounding an axial nozzle 78. Axial nozzle 78 is supplied fuel from axial passageway 80 which connects wtih a fuel line 82. Nozzles 76 connect with an annular fuel passageway 84 which connects with a second fuel line 86 thru duct 88. Burner head 74 is supported within the throat by means of spider 90 secured to flange 72 at one end and to burner head 74 at the other. Burner head 74 is generally frusto-conical in form to provide flared surface 92 which serves as a baffle for injected combustion air as discussed more fully hereinafter. The face of burner 74 is chamfered or bevelled to provide annular surface 94 for positioning the ring nozzles 76 normally thereto. The nozzles 76 and surfaces 94 are arranged so that a selected divergence of fuel from the nozzles is provided in accordance with the selected impingement line of the flame on throat 70. This angle is in the range of 30–60° with the axis of the burner head. Any suitable number of ring nozzles such as 5 to 10 or more may be utilized but 6 or 7 nozzles in the ring are usually utilized. Burner tubes 76 and 78 are threaded and screwed into threaded openings in their respective faces. While the burner face is shown with a circular axial section for the axial nozzle and a chamfered section for the nozzles in the ring, the entire face may be arcuate with the center of the face being selected to provide the desired curvature to place the burner nozzles normal to the face and at the desired angle to the axis of the burner head.

It is also feasible to mount the ring nozzles on an annulus or feeder ring 84 which is not within a burner head but separately mounted substantially in the position shown while burner nozzle 78 is separately mounted on a support supplied by a separate gas passageway. In such an arrangement, a baffle transverse to the axis of the arrangement is provided so as to cooperate with the air supply structure in injecting an annular mass of air thru the throat 70 as explained hereinafter.

Primary combustion air is supplied by blower 22 thru conduit 96 which directs an annulus of air over burner 74 thru throat 70 into the kiln. An outer annulus of secondary air is forced into the throat 70 by the suction of exhaust fan 28 in stack 26 as indicated by arrows 98. The primary air annulus mixes with and vaporizes the liquid fuel from ring nozzles 76 and causes the flame to impinge upon the inner end of throat 70 which deflects the flame inwardly into the kiln. The flow of secondary air and unused primary air into the kiln causes mixing with the main fuel supply injected thru nozzle 78 and projection of the flame deep into the kiln such as half way or two-thirds of the way thru the kiln.

Liquid fuel for the process is supplied from tank 100 thru a main fuel line 102, by the impetus of pump 103, which connects with branch fuel lines 82 and 86. The flow rate of fuel thru axial nozzle 78 is controlled to provide at least half and preferably 70 to 90 percent of the fuel supplied for heat release in the kiln while the balance of the fuel is injected thru nozzle 76. Motor valve 104 in line 86 is automatically controlled thru temperature recorder controller 106 which is responsive to the temperature in stack 26 sensed by thermocouple 108. Thus, instrument 106 is set to maintain a selected stack temperature by varying the fuel flow to nozzle 78 as moisture and temperature conditions in the rock aggregate change. In a similar manner, motor valve 110 in line 86 is operated by temperature recorder controller 112 in response to the temperature sensed by thermocouple 114 in aggregate outlet 34. Thus the heat input or fuel rate thru ring nozzles 76 is varied so as to maintain a selected rock temperature adjacent the outlet of the kiln.

In order to prevent excessive stack temperatures in the event the feeding of rock to the kiln is interrupted because of mechanical or other failure, a motor valve 116 is positioned in line 102 and is regulated by temperature recorder controller 118 which is sensitive to the temperature in the stack as sensed by thermocouple 108 and is set to close valve 116 when a selected maximum temperature above the normal operating temperature is reached. The maximum can be set at 50 to 200° F. above the normal operating temperature as desired. Valve 116 is a normally open valve and is closed as a safety measure when an excessive stack temperature is reached.

Pilot burner tube 120 is positioned with its tip adjacent the ring nozzles and in a low pressure area near the burner face axially inside of the high pressure area along the surface 92 of burner 74 near its juncture with the face 94 of the burner. The flared surface 92 of the burner directs the primary air outwardly and forwardly into throat 70 so as to cause the flame to bloom outwardly from the burner nozzles. By positioning the tip of burner 120 in the low pressure area produced by the flow of primary air over the flared burner surface, the flame from pilot burner 120 is not readily extinguished. It has been found that it is necessary to maintain this pilot flame at all times during operation of the burner in order to maintain continuous burner flame. Pilot burner 120 is supplied fuel from any suitable source of liquid or gaseous fuel thru line 122.

It should be understood that burner 74 is movable axially on support brackets 90 to provide for adjustment of the burner flame with respect to throat 70. At start up, the pilot burner is lighted and fuel flow thru the burner nozzles is initiated with air being supplied by blower 22 and fan 28. The pilot flame must be steady. If too much secondary air is blowing past it with such velocity to carry off the flame, the pilot should be moved closer to the burner axis into the low pressure area directly in front of the burner face. The flame from the pilot burner should be directed tangentially to the liquid fuel from the ring nozzles at about 45° pointing downstream gas-wise. The burner position is regulated axially to provide a steady flame impinging upon the inner end of the throat 70 and projecting into the kiln at least half way thru same. When properly burning, the burner produces a blue to luminous flame on the bright side. The brighter flame has more radiant energy than the all-blue flame and is more desirable in the drying process.

As the necessary burner adjustments are made and the indicated temperature of the bulb in the pilot is no higher than 300 to 400° F., the aggregate is started moving thru the dryer. The dried aggregate temperature is usually controlled at about 300° F. as it leaves the kiln and instrument 112 is set at this desired temperature. The ideal stack temperature is 300° F., also, and it is particularly important that stack temperature should be no lower than 300° F. as the aggregate fines are removed from the dryer and are mixed with the dried aggregate in the hot asphalt treatment in the pug mill. However, stack temperatures above 300° F. produce a higher rate of heat loss thru the stack and the drying operation becomes less efficient as the heat loss becomes greater. As soon as the selected temperatures in stack 26 and aggregate outlet 34 are reached, instruments 106 and 112 control the flow of fuel to the axial and ring nozzles, respectively, so as to maintain the set temperatures.

The liquid propane or other LP-gas stream vaporizes rapidly when it leaves the burner nozzles and comes into contact with the impinging primary air stream which surrounds the ring nozzles. Diffusion of the outer layer of gas with air begins immediately to form a combustible mixture along the periphery of the interface or mixing zone. As the propane expands, the combustible mixture increases in volume and, when ignited, a substantial flame appears. The burner arrangement shown causes the flame to bloom and impinge upon the inner end of the throat, forcing the flame well forward into the kiln. With the introduction of secondary air induced by the stack fan, combustion begins with the outside layer of gas-air mixtures and extends into the core of the propane vapor stream from axial nozzle 78 and more gas-air mixing occurs. With proper regulation of primary and secondary air flow, complete combustion of the propane feed occurs with extension of the flame well into the kiln.

The burner of the invention burning liquid normally gaseous fuel projects the flame and heat well into the kiln and produces considerably lower throat temperature than is provided with conventional oil fired burners in a similar application.

In a typical installation, the burner has a face of about 6″ in diameter and the primary air conduit has a diameter of about 9″. The burner throat has a diameter of about 42″ and is about 3.5′ long.

Tests were made utilizing propane versus No. 5 fuel oil in a counterflow type rotary kiln or dryer. The dryer was nominally rated at 125 tons of aggregate per hour. The data obtained are presented in the table below:

TABLE

|  | Average of Readings Taken | |
| --- | --- | --- |
|  | No. 5 Fuel Oil | Propane |
| Time to start up dryer from cold start, minutes | 45 | 15 |
| Fuel consumed: | | |
| During start-up, gallons | 120 | 48 |
| To preheat fuel, gallons per hour | 1.9 | 0 |
| To heat aggregate, gallons per hour | 157.0 | 196.0 |
| Total gallons per hour | 158.9 | 196.0 |
| To heat aggregate, gallons per ton | 0.957 | 1.181 |
| Hot aggregate temperature ° F | 275 to 300 | |
| Flue gas analysis, percent by volume: | | |
| $CO_2$ | 3.9 | 3.4 |
| $O_2$ | 14.3 | 13.9 |
| Stack volume of air, c.f.m | 7700 | 7700 |
| Stack temperature, ° F | 157 | 169 |
| Combustion chamber outside shell temperature, ° F | 410 | 315 |

In all tests run the aggregate was heated to 275° F. to 300° F. at rates of 155 to 165 tons per hour.

When using fuel oil, the combustion takes place within the combustion chamber formed by the throat. The same combustion chamber was used in the test when burning propane but it was not required. The flame from the propane burner impinged on the last few inches of the throat adjacent the kiln. Most of the propane combustion occurred within the rotary drum of the kiln and this is not possible when burning fuel oil. The metal temperature of the secondary air shroud at the burner end of the drum was substantially higher when burning fuel oil, indicating considerably more heat loss to the atmosphere than occurs when firing with propane.

The longer preheat period required when using fuel oil represents substantial waste of heat when compared with propane firing. Normally when the plant is shut down, the rotary kiln is full of aggregate so that when the plant is started up, using fuel oil, the aggregate in the drum is contaminated with unburned oil and must be discarded. This is not the case when fired with propane. In addition, the drum must be heated for a sufficient period of time to remove the oil from the drum which accounts for the 30-minute longer starting time when using fuel oil.

The degree of turn-up or turn-down of the burner was about the same for both fuels. However, with propane the burner could be turned up at a faster rate for quicker heat. In fact, at start up when using propane the introduction of aggregate can be commenced when the kiln is about half way up operating temperature without any contamination of the aggregates and with production of 300° F. outlet temperature.

It is also essential to preheat the fuel oil which represents a gross heating value of 0.012 gallon of No. 5 fuel oil for every gallon burned. Also, considerably less compressed air is required for the combustion of propane compared to No. 5 fuel oil. In fact, the air blower capacity needed was only about 60 percent of that required for fuel oil. The tests also show that for a given size oil burner and air blower considerably more propane can be burned (more heat released for drying) in the same size unit, to increase the drying capacity of the plant.

Certain modifications of the invention will become apparent to those skilled in the art and the illustrative details disclosed are not to be construed as imposing unnecessary limitations on the invention.

I claim:
1. Apparatus comprising in combination:
   (1) a burner head having an expanded face, an axial fuel passageway terminating in an axial nozzle on said face, and a separate annular fuel passageway surrounding said axial passageway provided with several individual fuel outlet conduits terminating in a ring of nozzles in a uniform pattern on said face around said axial nozzle outwardly and obliquely directed relative thereto;
   (2) a first fuel line connected with said axial passageway having a motor valve therein;
   (3) a second fuel line connected with said annular passageway having a motor valve therein;
   (4) fuel supply means connected with the fuel lines of (2) and (3);
   (5) separate temperature control means operatively connected with the valves in said fuel lines for separately controlling the flow of fuel to the axial and to the ring of nozzles, respectively, of said burner;
   (6) means for passing a first annulus of primary air substantially longitudinally along said burner head into a combustion zone to which fuel from said ring nozzles is directed for burning principally last said fuel; and
   (7) means for passing a second annulus of secondary air cocurrently with said first annulus for burning principally fuel from said axial nozzle substantially downstream of the combustion zone of (6).

2. The apparatus of claim 1 wherein the burner head of (1) is substantially frusto-conical.

3. Apparatus comprising in combination:
   (1) a rotary generally cylindrical kiln having means for rotating same on a generally horizontal axis;
   (2) gaseous effluent means and solids inlet means in one end of said kiln;
   (3) outlet means for heated solids in the opposite end of said kiln;
   (4) an axial cylindrical opening of relatively large diameter in said opposite end and a cylindrical longitudinally extending coaxial throat terminating in its upstream and fluidwise adjacent said axial opening;
   (5) an axially disposed ring of burner nozzles directed outwardly and obliquely into the downstream end of said throat;
   (6) an axial burner nozzle within said ring directed axially into said kiln;
   (7) means for directing an annulus of primary air obliquely outwardly into said throat adjacent said ring of nozzles;
   (8) means for directing an annulus of secondary air into said kiln surrounding the annulus of primary air;
   (9) a stack connected by conduit means with the gaseous effluent means of (2) having exhaust means therein for exhausting gases from said kiln;
   (10) a first fuel line connected with the axial nozzle of (6) having a motor valve therein for varying the flow rate of fuel thereto;
   (11) a second fuel line connected with the ring of nozzles of (5) having a motor valve therein for varying the flow rate of the fuel thereto;
   (12) means for sensing the temperature of gases in the stack of (9) and controlling the motor valve of (10)

in response to the sensed temperature to maintain a relatively constant stack temperature; and
(13) means for sensing the tempertaure of heated solids in the outlet means of (3) and controlling the motor valve of (11) in response to the sensed temperature to maintain a relatively constant solids temperature.

4. The apparatus of claim 3 wherein the nozzles of (5) and (6) are mounted in a common burner head having an axial gas passageway connecting the fuel line of (10) with the axial nozzle and a surrounding annular passageway communicating with the fuel line of (11) and the ring of nozzles, said burner head being of frusto-conical shape and coaxial with said throat, said nozzles being disposed in the base of said head facing the interior of said kiln.

5. The apparatus of claim 4 wherein the means of (7) comprises a conduit coaxial with and surrounding said burner head and a blower communicating by a duct with said conduit.

6. The apparatus of claim 4 including a pilot burner adjacent said burner head having its tip positioned downstream of said burner head, adjacent thereto, and radially inside of the periphery of its face in an area of reduced pressure.

7. A process for heating particulate solids comprising the steps of:
(1) maintaining a tumbling mass of said solids progressing generally horizontally from an inlet to an outlet of a horizontally elongated heating zone;
(2) passing hot combustion gas through said heating zone in direct heat exchange with the tumbling solids;
(3) supply a substantial portion of the fuel for said combustion gas from a burner nozzle position centrally of the downstream end of said heating zone and directed thereinto upstream solidswise and substantially horizontally;
(4) supplying another substantial portion of the fuel for said combustion gas from a ring of burner nozzles concentric with the nozzle of step (3) and directed upstream into said zone;
(5) feeding an annulus of combustion air coaxial with and immediately surrounding the fuel of step (4) cocurrently therewith so as to mix with and burn the fuel of steps (3) and (4) within said heating zone in a flame elongated upstreamwise of said solids;
(6) sensing the temperature of solids egressing from said heating zone and regulating the rate of fuel input from the nozzles of step (4) in repsonse to the sensed temperature to provide a substantially constant selected solids temperature; and
(7) sensing the temperature of the effluent gas from said heating zone and regulating the rate of fuel input from the nozzle of step (3) in response to the sensed temperature to provide a substantially constant selected effluent gas temperature.

8. The process of claim 7 wherein the burner nozzle of step (3) and the nozzles of step (4) are separately supplied with liquid streams of normally gaseous hydrocarbon under substantial pressure, and the annulus of combustion air of step (5) comprises an inner annulus of primary air and an outer annulus of secondary air.

9. The process of claim 7 further comprising continuously maintaining a pilot flame in an area of relatively low pressure adjacent the burners of steps (3) and (4) so as to assure continuity of flame propagation from said burners.

10. The process of claim 7 wherein 70 to 90 percent of the total fuel is supplied by step (3) and the balance is supplied by step (4).

11. A process for heating and drying rock aggregates for hot mix asphalt which comprises the steps of:
(1) maintaining a tumbling mass of said aggregates progressing through an elongated cylindrical kiln rotating about its axis in a slightly inclined position so as to pass said aggregates from an inlet in the elevated end to an outlet in the lower end;
(2) heating the aggregates in said kiln by maintaining a burning mass of fuel extending over at least about half the length of said kiln;
(3) supplying the major portion of the mass of fuel of step (2) from an axial fuel nozzle in the downstream end of said kiln by injecting a liquid stream of hydrocarbon into said kiln;
(4) supplying the remaining portion of the fuel of step (2) from a ring of fuel nozzles surrounding the axial fuel nozzle of step (3) by injecting liquid streams of hydrocarbon into said kiln surrounding the axial stream of step (3);
(5) mixing combustion air with the fuel of steps (3) and (4) by injecting an annulus of air into said kiln surrounding the fuel streams thereby mixing air with the fuel of step (4) principally adjacent the periphery of said kiln and with the axial fuel of step (3) more remote from the fuel nozzles so as to project the combustion flame at least half way through said kiln;
(6) regulating the flow of fuel in step (3) so as to maintain a predetermined effluent combustion gas temperature; and
(7) regulating the flow of fuel in step (4) so as to maintain a predetermined outlet aggregate temperature.

12. The process of claim 11 wherein step (6) is effected by sensing the effluent combustion gas temperature and automatically regulating the axial fuel flow rate in response to the sensed temperature and step (7) is effected by sensing the outlet aggregate temperature and automatically regulating the flow rate of fuel through the ring of nozzles in response thereto.

References Cited
UNITED STATES PATENTS

| | | | |
|---|---|---|---|
| 2,549,952 | 4/1951 | Wheelock | 236—1 |
| 2,625,466 | 1/1953 | Williams | 158—11 X |
| 2,806,516 | 9/1957 | Brola | 158—11 |

FREDERICK L. MATTESON, JR., *Primary Examiner.*

JOHN J. CAMBY, *Examiner.*

UNITED STATES PATENT OFFICE
CERTIFICATE OF CORRECTION

Patent No. 3,336,019                              August 15, 1967

Robert C. Pryor

It is hereby certified that error appears in the above numbered patent requiring correction and that the said Letters Patent should read as corrected below.

Column 6, lines 52 and 53, strike out "in its upstream and fluidwise" and insert instead -- in its upstream end fluidwise --; column 7, line 33, for "tempertaure" read -- temperature --; same column 7, line 32, for "supply" read -- supplying --.

Signed and sealed this 15th day of October 1968.

(SEAL)
Attest:

Edward M. Fletcher, Jr.                          EDWARD J. BRENNER
Attesting Officer                                     Commissioner of Patents